(12) United States Patent
Wick

(10) Patent No.: US 6,386,569 B1
(45) Date of Patent: May 14, 2002

(54) FIFTH-WHEEL HITCH COUPLING ADAPTER

(76) Inventor: Joseph Wick, 8699 Huber Rd., Belvidere, IL (US) 61008

(*) Notice: Subject to any disclaimer, the term of this patent is extended or adjusted under 35 U.S.C. 154(b) by 0 days.

(21) Appl. No.: 09/561,792

(22) Filed: May 1, 2000

Related U.S. Application Data

(60) Provisional application No. 60/132,134, filed on May 1, 1999.

(51) Int. Cl.$^7$ ................................................ B60D 1/00
(52) U.S. Cl. .............................. 280/418.1; 280/415.1; 280/417.1
(58) Field of Search ...................... 280/415.1, 416.1, 280/417.1, 413.1, 433, 495

(56) References Cited

U.S. PATENT DOCUMENTS

| | | | |
|---|---|---|---|
| 3,881,619 A | 5/1975 | Morris | 214/620 |
| 3,941,407 A * | 3/1976 | Breford | 280/415 A |
| 4,288,091 A | 9/1981 | Umeda et al. | 280/415 A |
| 4,343,484 A | 8/1982 | Van Antwerp | 280/479 |
| 4,502,706 A | 3/1985 | Frambach, Sr. | 280/415 A |
| 4,824,134 A * | 4/1989 | Harris | 280/438.1 |
| 5,344,172 A * | 9/1994 | Jaun | 280/415.1 |
| 5,513,869 A * | 5/1996 | Putnam | 280/415.1 |
| 5,788,257 A | 8/1998 | Meyerhofer | 280/416.1 |
| 6,135,482 A * | 10/2000 | Larkin | 280/416.1 |
| 6,170,850 B1 * | 1/2001 | Works | 280/433 |

* cited by examiner

*Primary Examiner*—J. J. Swann
*Assistant Examiner*—L. Lum
(74) *Attorney, Agent, or Firm*—Keith Frantz

(57) ABSTRACT

An adapter includes connector elements for releasably coupling to a quick-connect coupling of a loader or other off-road vehicle, and a fifth-wheel for releasably coupling to a fifth-wheel king pin equipped trailer. The adapter is adapted for connecting to the coupling from either a resting position on the ground, or a hanging position from the fifth-wheel king pin of the trailer.

7 Claims, 5 Drawing Sheets

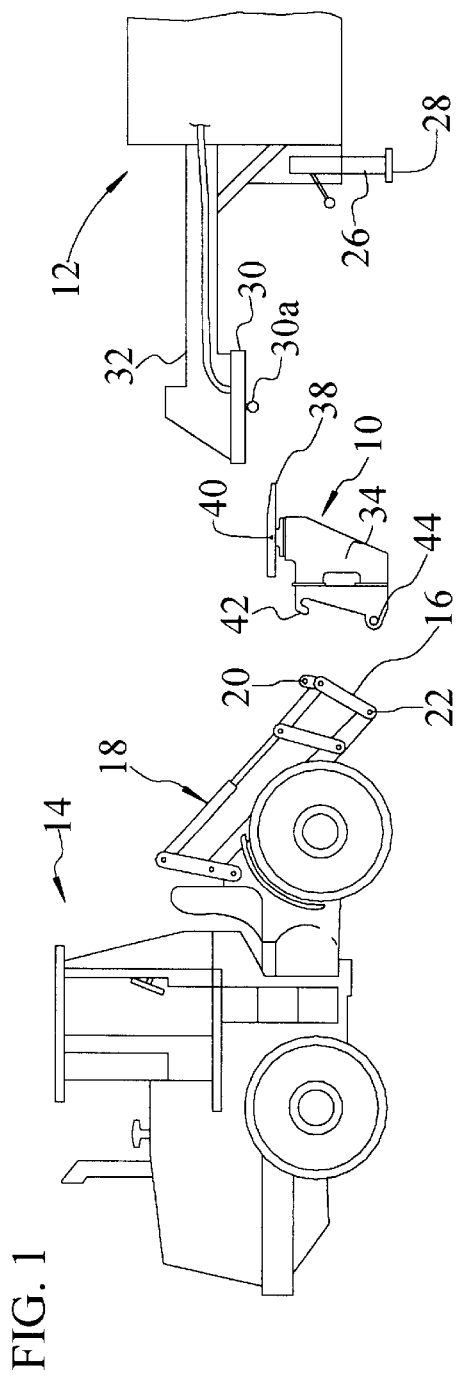
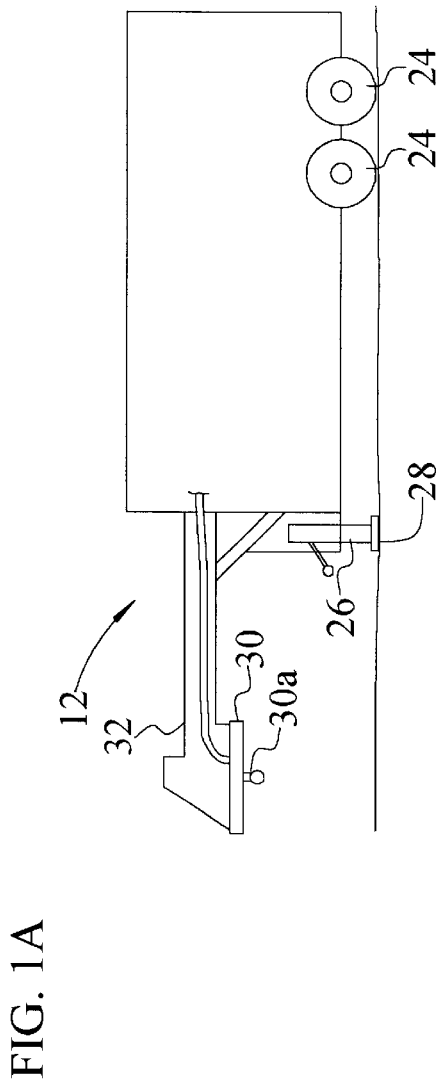
FIG. 1
FIG. 1A

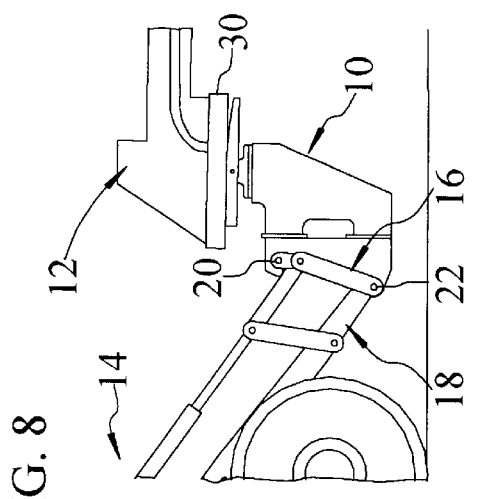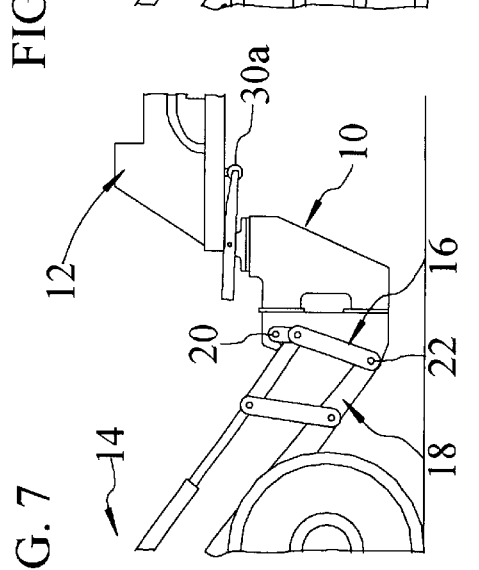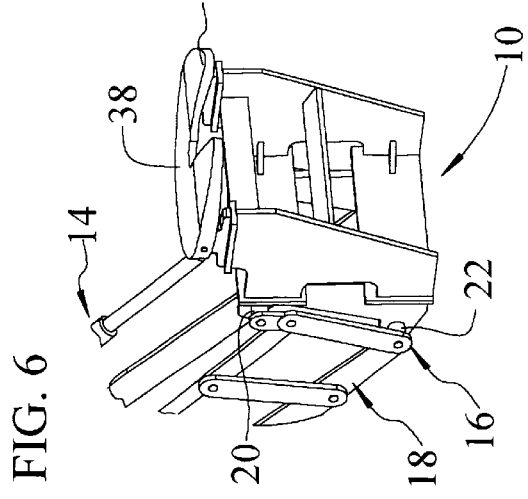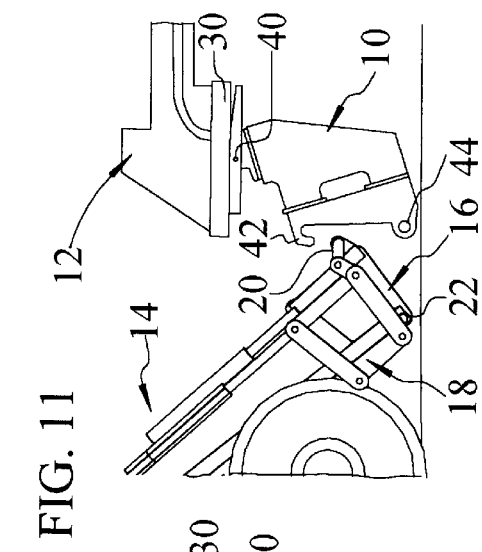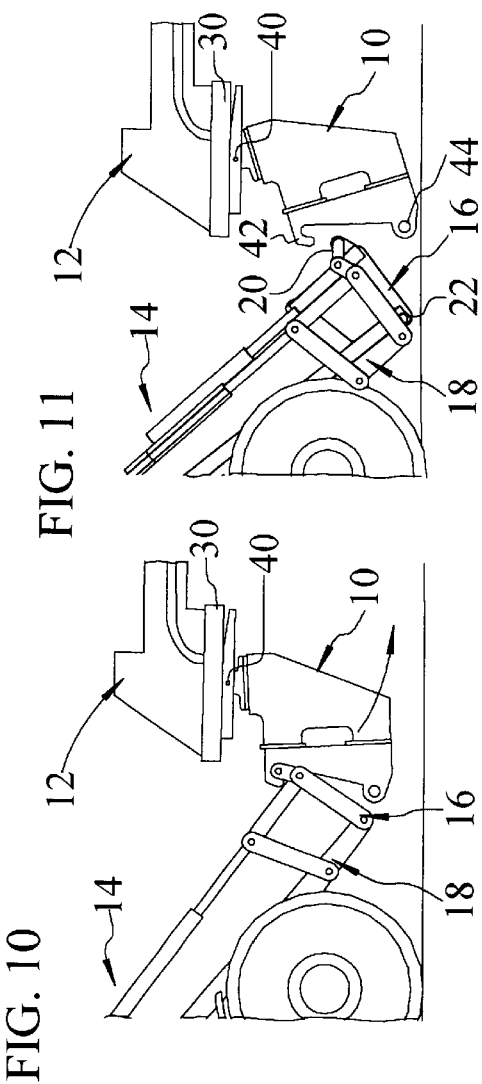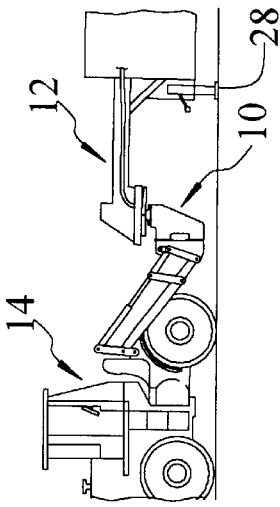

FIFTH-WHEEL HITCH COUPLING ADAPTER

CROSS-REFERENCE TO RELATED APPLICATIONS

This application claims the benefit of U.S. Provisional Application No. 60/132,134, filed May 1, 1999.

BACKGROUND OF THE INVENTION

1. Field of Invention

The present invention relates generally to fifth wheel coupling apparatus for use in connecting to a wheeled unit having a fifth wheel king pin for moving or towing the unit. More particularly, the invention relates to an adapter suitable to connect between a semi-stationary fifth-wheel king pin equipped unit and a tractor, loader, skid-steer or like equipment having a quick-connect coupler of the type typically used for connecting buckets and other accessories for movement of the unit between locations where paved roadways are not available.

2. Description of Prior Art

There are a variety of relatively large, semi-stationary equipment that remain at a work site for extended periods of time, but for which there may be a need, from time to time, to be moved from one location at the work site to another location.

One example of this type of equipment would be a large grinding unit used in grinding large tree branches for creating mulch or other recycling purposes. These and other types of semi-stationary equipment are typically equipped with a conventional fifth wheel king pin for connection to the fifth wheel of a semi-tractor for movement over paved roadways such as when moving the equipment to the work site.

A variety of methods are used to move such equipment between locations at a work site having paved roadways. For example, the equipment may be moved with a semi-tractor, or with an available prior adapter suitable for use between the equipment and another vehicle adapted for use on paved roadways. However, many work sites do not have paved roadways between the desired locations for the semi-stationary equipment, which often precludes the use of semi-tractors and other vehicles with prior adapters for connection to the fifth wheel king pin to move the equipment.

In such instances, movement of the equipment typically requires or is accomplished with the use of a tractor, loader, skid-steer or other equipment capable of maneuvering over unpaved ground typically equipped with a bucket or forks that are utilized for moving the unit. In using a bucket to move the equipment, the bucket is positioned above the equipment fifth wheel, chains are wrapped around the arm of the unit, and then wrapped around or otherwise connected to the bucket or loader arms. To move the unit, the bucket and loader arms are then further raised to raise the forward equipment support from the ground, and the unit is pulled with the chains to the new location.

Such methods for moving semi-stationary equipment over unpaved ground require two people, one operating the loader to position and hold the bucket above the unit, and a second person to wrap the chains around the unit and connect the chains to the bucket or loader arms. This is wasteful of manpower, and presents the possibility of damage to the fifth wheel king pin and the electrical and hydraulic lines in that area of the trailer used during hook-up and highway transport of the unit, resulting in the need for repair prior to transporting the unit again on the highway. These methods also present the potential for injury to the person wrapping and connecting the chains, and there is the possibility of tipping while maneuvering over uneven ground with the loader arms operating at a relatively high position.

Alternately, for example, loader equipped forks may "lift" the arm, either from above with the use or chains as previously described, presenting all of the same difficulties and dangers, and the additional consideration to make sure the chains do not slide off the forks, or from below by lifting up on the fifth wheel king pin area of the trailer and then attempting to maneuver the unit with an extremely limited hold on the unit.

One prior adapter that attempted to address some of the above-described problems is shown in Morris, U.S. Pat. No. 3,881,619. The adapter shown in Morris includes elongated tracks for receiving the forks of a fork lift, a pneumatic power system to lock the forks in position in the tracks and to connect to the pneumatic brake system of the trailer to be towed, and a fifth-wheel hitch for connection to the trailer king pin. However, use of this adapter requires that either the fork lift operator leave the fork lift, or a second person be present, to make the connection with the trailer pneumatic brake system and to turn on the compressor actuation of the pneumatic locking mechanism prior to movement of the trailer.

Thus, there remains a need for an improved adapter for connection between a semi-stationary unit equipped with a fifth-wheel king pin and vehicles suitable for moving the unit along unpaved ground, the adapter being adapted for use in a manner that precludes damage to the trailer and eliminates the need for the operator of the moving equipment to leave his seat or for the assistance of a second person.

SUMMARY OF THE INVENTION

The general aim of the present invention is to provide a new and improved adapter-coupling apparatus for use between a fifth-wheel king pin equipped semi-stationary wheeled unit and a loader or similar equipment having a quick connect coupler of the type typically used for connecting buckets and other working accessories, the adapter being adapted to enable safe and relatively easy movement of the unit by the loader from one location to another at a work site over unpaved roadways, and without the danger of damaging electrical wires and hydraulic lines that are provided to the area of the fifth wheel king pin for use when the unit is transported on roadways with conventional pulling semi-tractors.

Detailed objectives are to achieve the foregoing by providing an adapter coupling that:

may be attached to a loader, and then coupled to the semi-stationary unit without the need for the operator to leave his seat in the loader;

may be stored either on the ground or attached in position on a wheeled unit;

saves time by quick and easy attachment in approximately a couple of minutes time, and often in under a minute when the coupling apparatus is left in position on the unit;

is safer than prior methods due to the fact that an operator does not need to be in the vicinity of the unit or coupling for connection or movement of the unit, provides unobstructed operator visibility as compared with conventional methods for moving such units at such locations;

provides for steering through approximately 180 degrees for most equipment;

provides improved control of movement of the unit due to hitch point and steering capabilities of articulated wheel loader;

is extremely durable and extended life expectancy with only occasional lubrication of the fifth wheel components;

may be adapted for use with any type of loader quick-connect coupling arrangement; and permits use of the maximum lift capability of the loader due to the lift arms operating in the range of approximately 6–18 inches from ground level, thus substantially reducing the risk of tipping since the loader arms remain relatively low during the movement of the unit.

These and other objectives and advantages of the invention will become more apparent from the following detailed description when taken in conjunction with the accompanying drawings.

BRIEF DESCRIPTION OF THE DRAWINGS

FIG. 1 is a side view showing a loader, a fragmentary view of the forward portion of a semi-stationary wheeled trailer equipped with a fifth-wheel king pin, and an adapter incorporating the unique aspects of the present invention to facilitate moving the trailer with the loader.

FIG. 1A is a side view of the entire trailer shown in part in FIG. 1.

FIGS. 6–11 are sequential views showing the adapter as it is connected to the loader and the trailer, movement of the trailer, and disconnecting of the loader from the adapter while remaining connected to the trailer.

Figure 2:
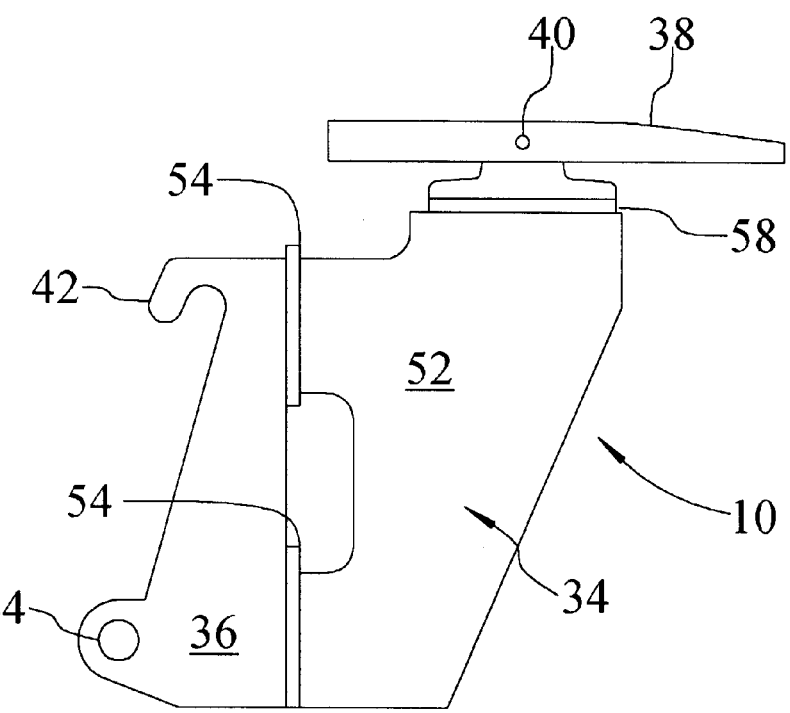
FIGS. 2, 3, 4 and 5 are enlarged side, front, top and back views of the adapter shown in FIG. 1.
Figure 3:
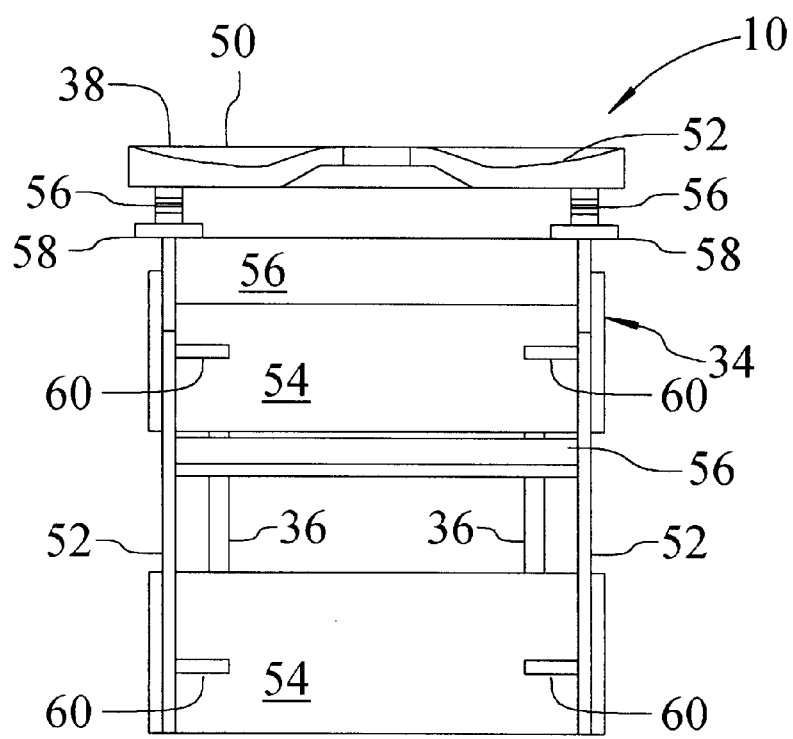
Figure 4:
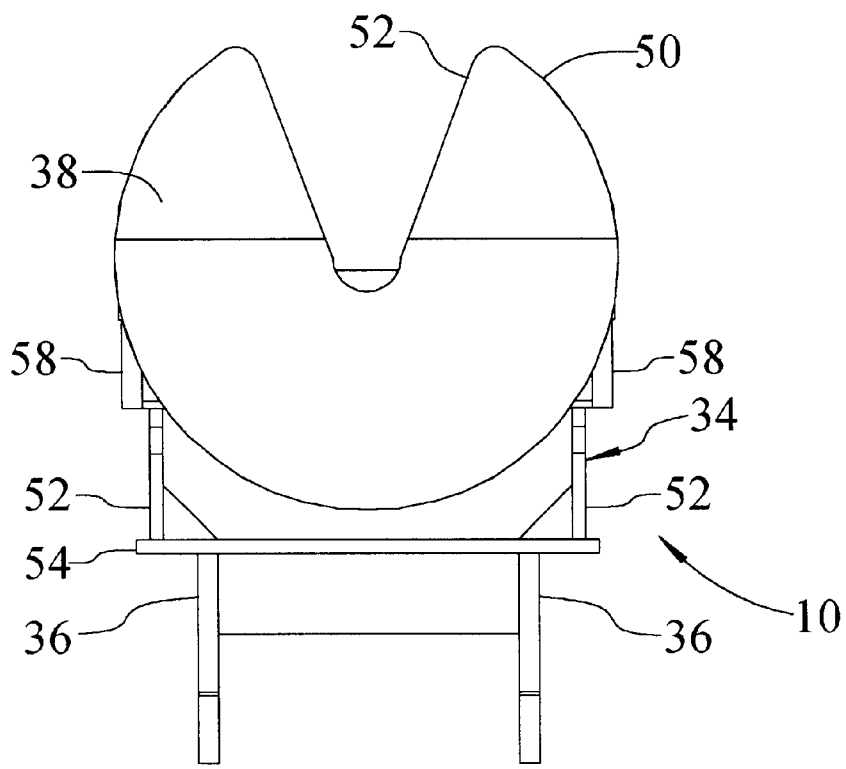
Figure 5:
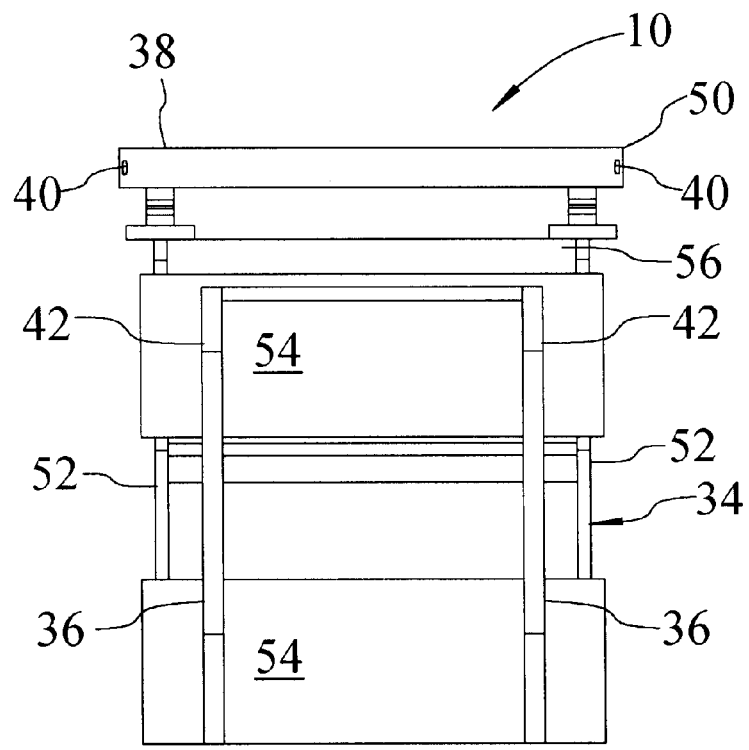

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in an adapter 10 (FIG. 1) adapted to assist in moving a trailer 12 with a loader 14.

The loader 14 is equipped with a quick-connect coupling 16 located at the free end of an eight-bar parallel hydraulic lift mechanism 18. The quick-connect includes an upper coupling element in the form of a laterally extending horizontal support bar 20, and a lower coupling element in the form of a pair of laterally spaced locking pins 22 located at the lower end thereof that are hydraulically actuated for lateral movement (outwardly and inwardly) between two horizontal positions for locking and unlocking into laterally extending, horizontal openings, actuation of the locking pins being remotely controlled by the operator of the loader as is conventional with quick-connects of this general type.

The trailer 12 is a semi-stationary trailer equipped with rear wheels 24 (FIG. 1a) and legs 26 to support the forward end of the trailer. In the embodiment shown, the support comprises a pair of laterally spaced legs and feet 28 that are vertically adjustable to enable leveling the front of the trailer. A fifth wheel unit 30 located at the forward end of the arm 32 includes a king pin 30a to enable connection to a semi-tractor fifth-wheel hitch for highway transportation of the trailer. It is noted that as described herein, the front of the trailer 12 faces the front of the adapter 10, and thus the direction forwardly as used in reference to the trailer (to the left in FIG. 1) is opposite the direction forwardly as used in reference to the adapter (to the right in FIG. 1).

In accordance with the present invention, the adapter 10 is uniquely adapted for quick connection between the loader 14 and the trailer 12 to assist in moving the trailer from one location to another at a work site, and is especially useful in moving the trailer at a work site without paved roadways.

In carrying out the invention, the adapter 10 includes a frame 34 (FIG. 2) with a top portion, a back portion and supporting structure therebetween, a pair of laterally spaced connector elements in the form of vertically extending arms 36 connected to and extending rearwardly from the back portion of the frame, and a fifth wheel hitch 38 pivotally connected at 40 to the top of the frame.

Figure 12:
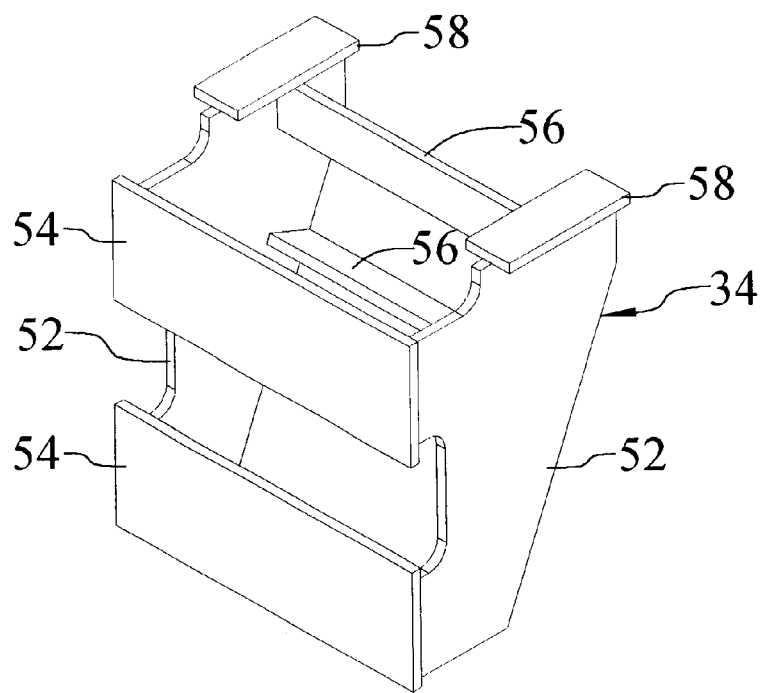
FIGS. 12 and 13 are enlarged perspective views of a frame structure of the adapter.
Figure 13:
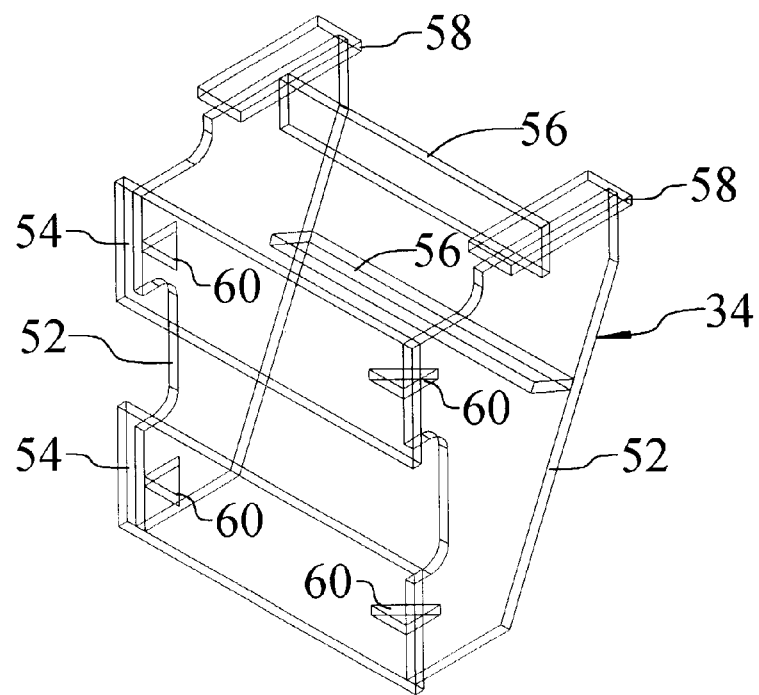

The frame 34 is preferably constructed from structural steel or aluminum, such as by welding structural steel members together into a structural support arrangement. In the embodiment shown, these members include parallel, laterally spaced side members 52 (see e.g., FIGS. 12 and 13), vertically spaced back members 54, front cross-support members 56, a pair of laterally spaced upper plate members 58, and support gussets 60.

The arms 36 are positioned and adapted for coupling to the quick-connect 16 of the loader 14. The arms are laterally spaced on, and in the embodiment shown, welded to the back of the frame 34. In general, the arms are formed with vertically spaced, upper and lower connector elements formed with laterally spaced and laterally extending openings sized to slidably receive the coupling elements of coupling 16. In the embodiment shown, the arms are formed with upper connector elements in the form of downwardly extending hook portions 42 and lower connector elements in the form of horizontally extending openings 44, the hooks and opening of each arm being preferably generally vertically aligned with one another. The fifth wheel hitch 38 is generally of conventional construction, including a slotted, generally U-shaped plate member 50 with a tapered entry end 52, and is positioned and adapted for coupling to the fifth wheel king pin 30 of the trailer 12. The bottom of the adapter 10, and more particularly, the bottom of frame 34 and the arms 36 are formed substantially flat and having sufficient supporting length under the center of gravity of the adapter such that the adapter will stand upright on the ground as shown in FIG. 1.

With this arrangement, the adapter 10 is uniquely adapted to assist in using a loader 14 to move the trailer 12. With the adapter resting on the ground as shown in FIG. 1, the adapter is coupled to the loader by bringing the upper bar 20 of the quick-connect 16 upwardly and forwardly past the free ends of and into the hooks 42, pivoting or swinging the lower portion of the quick connect forwardly toward the back of the adapter, and then actuating the locking pins 22 of the quick-connect into the openings 44 of the adapter.

FIGS. 6–11 generally illustrate sequentially use of the adapter 10 after connection to the loader 14. Specifically, FIG. 6 shows the adapter connected to the loader and raised from the ground for travel to the trailer 12. FIGS. 7 and 8 illustrate the adapter as it is maneuvered into coupling position with the fifth wheel king pin 30a of the trailer. The front of the trailer is then lifted, raising the feet 28 from the ground, and the trailer is easily maneuvered to another location at the work site (see FIG. 8). After the trailer has been moved to the new location, the adapter and arm 32 are lowered until the feet of the trailer are resting on the ground (FIG. 9), after which the adapter may be decoupled from the fifth wheel king pin and taken to, for example, a storage location.

Alternately, the adapter 10 may be left connected to the trailer 12 for storage and subsequent trailer repositioning purposes. In this instance, the quick-connect 16 of the loader 14 is disconnected from the adapter by first releasing locking pins 22, pivoting the bottom of the quick-connect outwardly from the adapter as illustrated in FIG. 10, and simultaneously pivoting the entire quick-connect downwardly until the upper support bar 20 slips out of the hooks 42. As can be seen in FIGS. 10 and 11, with the fifth wheel hitch 38 remaining connected to the trailer, the back of the adapter pivots downwardly about 40 as the quick-connect is pivoted from engagement with the adapter, and the adapter hangs from the fifth wheel in an orientation that permits re-coupling of the loader, and preferably, to avoid the need for substantial rotation of the adapter upon re-coupling, the weight distribution and center of gravity of the adapter is preferably such that the hooks are positioned approximately vertically aligned with the holes 44 when viewed from the side. As will be evident, in the event the trailer is to be again relocated, re-coupling of the loader is quickly and easily accomplished by the operator using steps in reverse of disconnection steps without the need for the operator to leave the loader. To this end, the free ends of the hooks are configured to insure entry of the quick-connect support bar 20 as the adapter hangs from the fifth wheel, and such that as the bar enters into and raises the hooks, the lower portion of the arms are raised into position for engagement between the pins 22 of the quick-connect and the holes 44 of the adapter.

From the foregoing, it will be apparent the present invention brings to the art a new and improved adapter for use between a loader or other vehicle suitable for travel on unpaved roadways and equipped with a quick-connect coupling and a semi-stationary unit equipped with a fifth-wheel king pin to assist in moving the unit from one location to another at a work site where unpaved roadways are not available between the locations. By virtue of its unique design, the adapter is quickly and easily connected by the vehicle operator to the vehicle while the adapter is either resting on the ground or hanging from the semi-stationary unit, and to the semi-stationary unit without the need for an additional person and without a danger of damage to the unit.

I claim:

1. An adapter for releasable connection between (i) a vehicle equipped with a quick-connect coupling having first and second vertically spaced coupling elements and (ii) a trailer equipped with a downwardly extending fifth-wheel king pin, the adapter comprising:

a frame having a base sized to support the adapter in an upright position;

first and second vertically spaced connector elements extending rearwardly from said frame, said first and second connector elements each being formed with a pair of laterally spaced and laterally extending openings sized to slidably receive said first and second coupling elements, the openings of each pair of connector elements being vertically aligned with one another when viewed from behind; and an upwardly facing fifth wheel pivotally connected to said frame and releasably connectable to the trailer king pin.

2. The adapter as defined in claim 1 in which the pair of openings of said first connector element define downwardly opening hooks sized to slidably receive said first coupling element upwardly therein.

3. The adapter as defined in claim 1 in which the center of gravity of the adapted is positioned in relation to the fifth wheel such that said pairs of openings are generally vertically aligned when viewed from the side with the fifth wheel connected to the trailer king pin and the adapter hanging therefrom.

4. The adapter as defined in claim 1 in which the fifth wheel is pivotally connected to the frame above the connector elements.

5. An adapter for releasable connection between (i) a vehicle equipped with a coupling having first and second vertically spaced coupling elements and (ii) a trailer equipped with a downwardly extending fifth-wheel king pin, the adapter comprising:

a frame having a base sized to support the adapter in an upright position;

first and second vertically spaced connector elements extending rearwardly from said frame, said first connector element being formed with a pair of laterally spaced and downwardly opening hooks sized to slidably receive said first coupling element, said second connector element being formed with a pair of laterally spaced and laterally extending openings sized to slidably receive said second coupling element; and an upwardly facing fifth wheel pivotally connected to said frame and releasably connectable to the trailer king pin.

6. The adapter as defined in claim 5 in which the center of gravity of the adapted is positioned in relation to the fifth wheel such that said hooks of said first connector element and the openings of said connector element are generally vertically aligned when viewed from the side with the fifth wheel connected to the trailer king pin and the adapter hanging therefrom.

7. The adapter as defined in claim 5 in which the fifth wheel is pivotally connected to the frame above the connector elements.

\* \* \* \* \*